United States Patent [19]
Stroud et al.

[11] Patent Number: 5,809,859
[45] Date of Patent: Sep. 22, 1998

[54] THREADED RING AND NUT VARIABLE TARGET SIZE SAWGUIDES FOR CIRCULAR GANG SAWS

[75] Inventors: Brian T. Stroud; John Sergeant; Robert Hart, all of Salmon Arm, Canada

[73] Assignee: Newnes Machine Ltd., Salmon Arm, Canada

[21] Appl. No.: 763,810

[22] Filed: Dec. 11, 1996

[51] Int. Cl.$^6$ ........................................................ B27B 5/29
[52] U.S. Cl. ........................ 83/829; 83/425.4; 83/508.3; 83/828
[58] Field of Search .............................. 83/821, 824, 827, 83/828, 829, 425.4, 508.3

[56] References Cited

U.S. PATENT DOCUMENTS

| | | | |
|---|---|---|---|
| 295,792 | 3/1884 | Neacy | 83/828 |
| 469,543 | 2/1892 | Cook | 83/425.4 |
| 477,861 | 6/1892 | Hinkley | 83/828 |
| 544,282 | 8/1895 | Bigger | 83/828 |
| 1,203,940 | 11/1916 | Trout | 83/828 |
| 2,160,957 | 6/1939 | Criner | 83/829 X |
| 2,696,253 | 12/1954 | Hartman | 83/829 X |
| 3,003,531 | 10/1961 | Niebuhr | 83/828 X |
| 3,580,305 | 5/1971 | Wright | 83/508.3 |
| 3,688,820 | 9/1972 | Lundblom . | |
| 3,742,796 | 7/1973 | McMillan | 83/102.1 |
| 3,750,513 | 8/1973 | Cromeens | 83/425.4 |
| 3,828,635 | 8/1974 | Smith | 83/425.4 X |
| 3,992,614 | 11/1976 | Buss | 235/151.1 |
| 4,414,875 | 11/1983 | Pearson | 83/508.3 |
| 4,690,188 | 9/1987 | Hasenwinkle | 144/378 |
| 4,848,200 | 7/1989 | McGehee | 83/169 |
| 4,909,112 | 3/1990 | Rosenthal | 83/425.4 |
| 4,977,802 | 12/1990 | Kirbach | 83/13 |
| 5,287,782 | 2/1994 | Scott | 83/447 |
| 5,325,751 | 7/1994 | Green et al. | 83/13 |

FOREIGN PATENT DOCUMENTS

| | | | |
|---|---|---|---|
| 2034794 | 7/1992 | Canada | 83/821 |

*Primary Examiner*—Eugenia Jones
*Attorney, Agent, or Firm*—Antony C. Edwards

[57] ABSTRACT

A device for positioning sawguides for circular gang saws includes a first shaft rotatable about a first axis, an annular gear having an outer surface and a concentric threaded inner surface and rotatable in a first plane about a second axis, the first plane generally perpendicular to the second axis, the first shaft rotatably engagable with the outer surface of the annular gear wherein rotation of the first shaft about the first axis rotates the annular gear about the second axis, the annular gear journalled on and coaxial with a second shaft lying along the second axis, a collar slidably mounted on the second shaft and adapted for non-rotational longitudinal sliding along the second shaft, the collar having an outer threaded surface concentric with the threaded inner surface on the annular gear for journalled threaded engagement therein whereby rotation of the annular gear by the first shaft causes longitudinal translation of the collar along the second axis relative to the annular gear, first and second pairs of sawguides slidably mounted on the second shaft for longitudinal sliding thereon on opposed sides of the annular gear and the collar, the first pair of sawguides adjacent the annular gear, the second pair of sawguides adjacent the collar, and an actuator for urging the first and second pairs of sawguides slidably towards each other along the second shaft against the annular gear and the collar respectively, whereby the longitudinal translation of the collar along the second shaft relative to the annular gear causes relative longitudinal translation between the first and second pairs of sawguides on the second shaft.

9 Claims, 9 Drawing Sheets

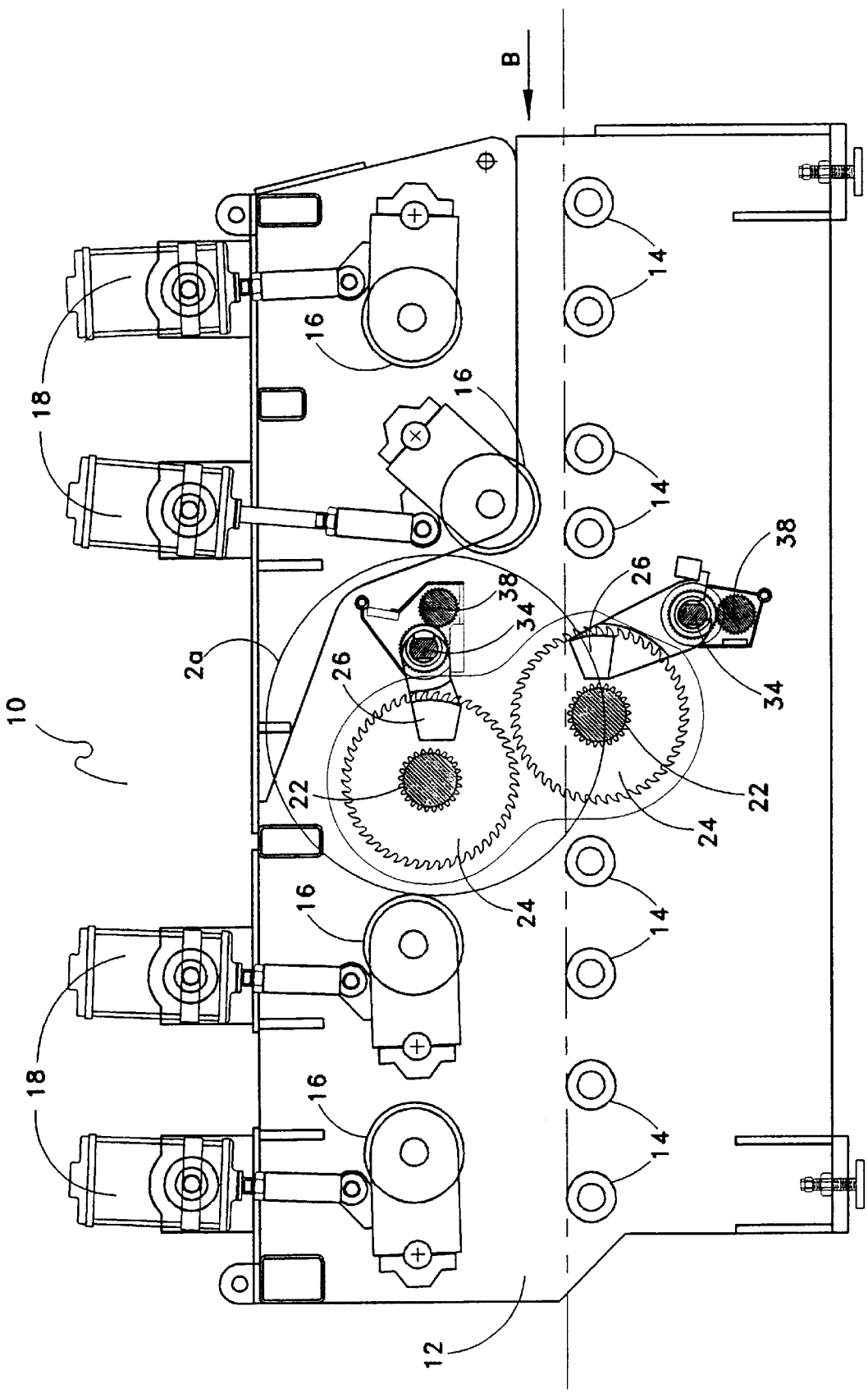

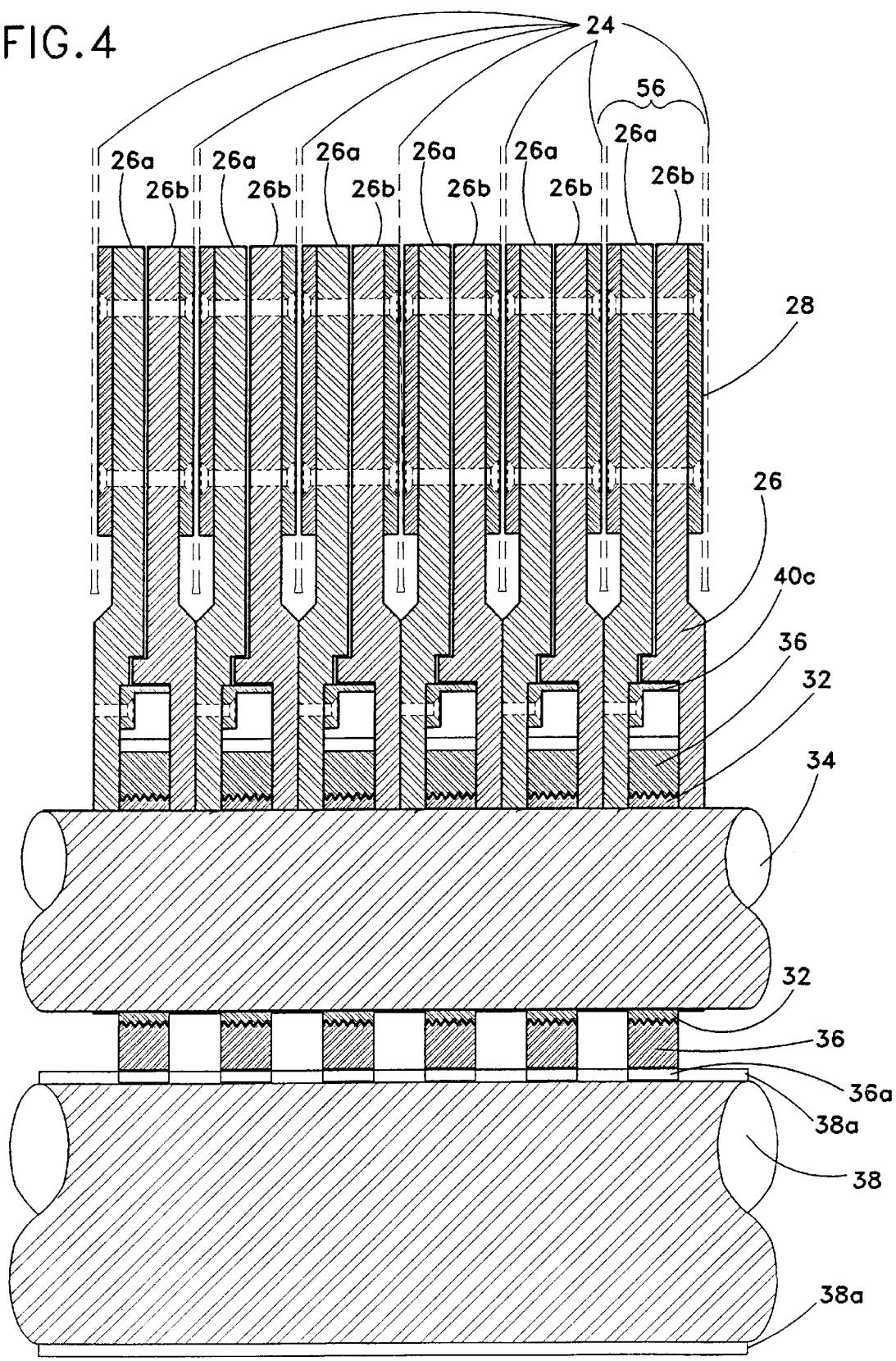

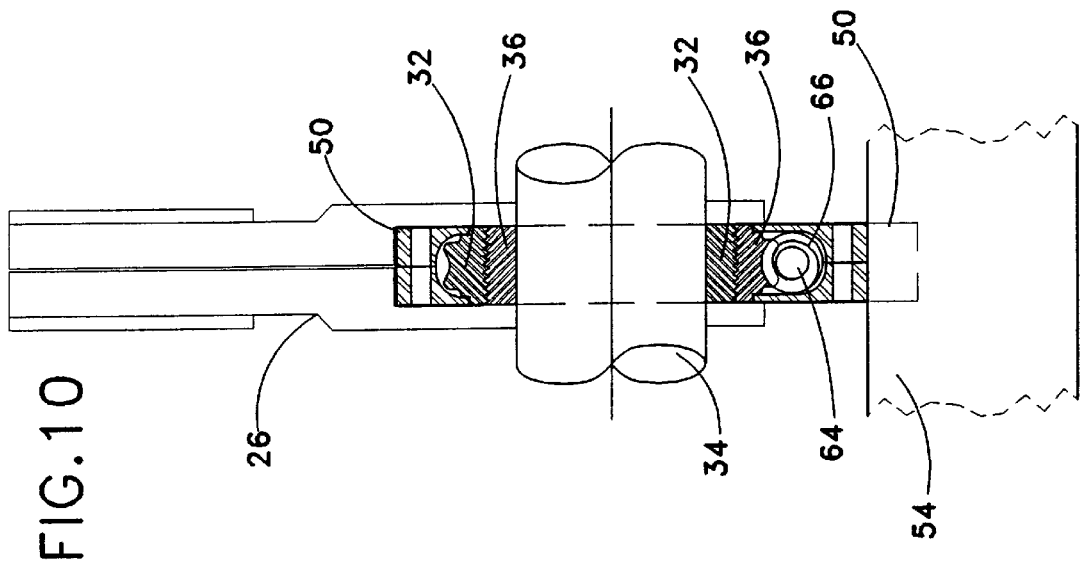
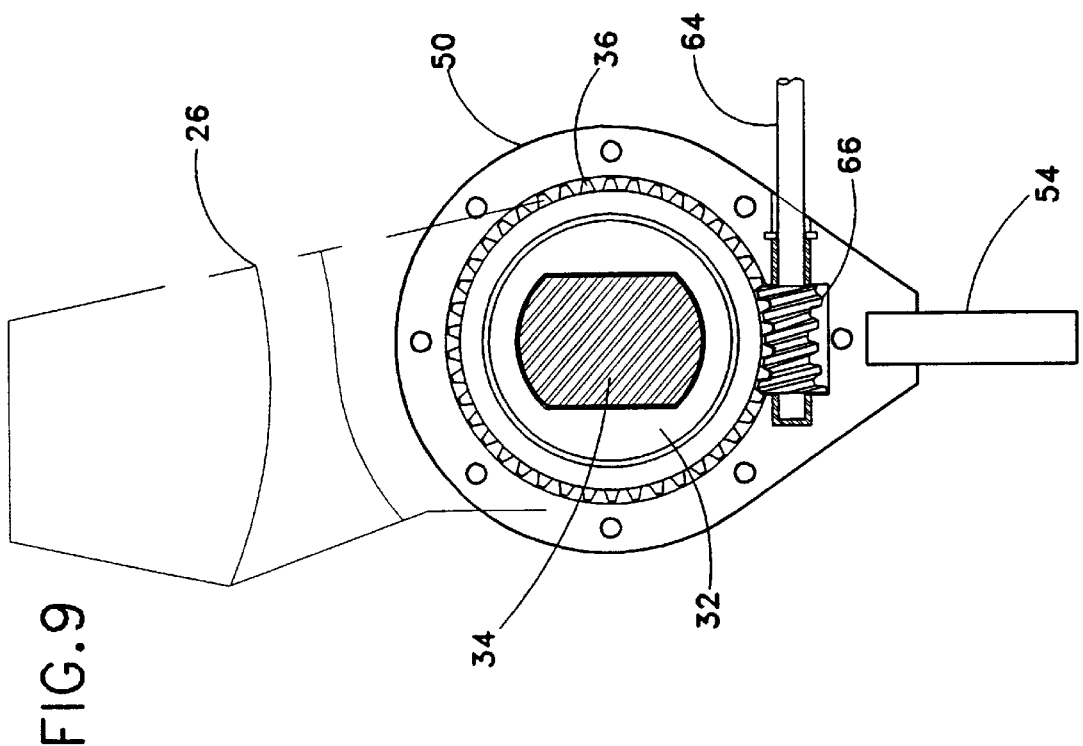

5,809,859

THREADED RING AND NUT VARIABLE TARGET SIZE SAWGUIDES FOR CIRCULAR GANG SAWS

FIELD OF THE INVENTION

This invention relates to the field of machinery used in sawmills, and in particular machinery relating to circular gang saws.

BACKGROUND OF THE INVENTION

Previously circular gang saws with a splined arbor were equipped with basically one means of adjusting the spacing between the saws. This method consists of sawguides with babbitt pads, or other material, that are sandwiched together by a hydraulic press at one end. In order to change the lumber target size that is, the spacing between the saws, sawguide bars are changed to accommodate different spacings. The saw blades are thereby positioned in a different width pattern once the sawguides have been replaced on the arbor and pressed together by the hydraulic press. Changing the sawguides requires the circular gang saw unit be shut down and disassembled so that the sawguides may then be manually removed and replaced. This process can cause considerable down time, resulting in lost productivity. This process does not allow quick changing of spacing between the saws while the circular gang saw unit is running and between successive lumber pieces being processed.

It is therefore an object of the invention to produce an apparatus that equips a circular gang saw with adjustable sawguides that may be remotely adjusted while the circular gang saw unit is operating, that may be adjusted to result in a closely spaced relation between the saw blades, and that are adjustable by a control system and actuators without having to manually change sawguides.

SUMMARY OF THE INVENTION

Gang saws are equipped with splined saw blade arbors on which an array of spaced apart parallel sawblades are splined. Corresponding sawguides, of the babbitt pad type (or other material), hold the saw blades in position between a parallel array of spaced apart opposed pairs of elongate sawguide members supporting opposed pairs of pads and the sawblades therebetween.

The array spacing is adjustable by means of internally threaded nuts or annular gears, hereinafter referred to as annular gears, that are journalled on a shaft that rotatably supports the array of pairs of sawguides, one threaded annular gear between each adjacent pair of sawguides in the array. The shaft has two opposing flat surfaces that prevent an array of correspondingly shaped externally threaded rings or collars, hereinafter referred to as collars, from rotating relative to the shaft, the threaded collars longitudinally slidably mounted on the shaft, one between each adjacent pair of sawguides, and sized to journal their external thread in threaded engagement within the internal thread of the corresponding internally threaded annular gear journalled on the shaft. The annular gears have external toothed surfaces to mesh with and rotatably engage either a pinion shaft parallel to the sawguide shaft or, alternatively, a shaft-mounted worm gear perpendicular to the sawguide shaft.

The pinion shaft or worm gear has either an actuator such as a step motor or crank, or other means of selectively controllable rotation, that when engaged, turns the pinion shaft or shaft-mounted worm gear and thus rotates the threaded annular gear which threads further on to, or further out of, the externally threaded collar threadably journalled therein, thereby selectively adjusting the spacing between the sawguides and saw blades. The pinion shaft or worm gear are selectively turned (for example from outside the gang saw unit or zone) in pre-determined angular increments to set the sawblade spacing required for the size of lumber to be cut.

In summary, the device of the present invention for positioning sawguides includes a first shaft rotatable about a first axis, an annular gear having an outer gear surface and a concentric threaded inner surface and rotatable in a first plane about a second axis, the second axis either perpendicular or parallel to the first axis and the first plane generally perpendicular to the second axis, the first shaft rotatably engagable with the outer gear surface of the annular gear whereby rotation of the first shaft about the first axis rotates the annular gear about the second axis, the annular gear journalled on and coaxial with a second shaft lying along the second axis, a collar slidably mounted on the second shaft and adapted for non-rotational longitudinal sliding along the second shaft, the collar having an outer threaded surface concentric with the threaded inner surface on the annular gear for journalled threaded engagement therein whereby rotation of the annular gear by the first shaft causes longitudinal translation of the collar along the second axis relative to the annular gear. First and second pairs of sawguides are slidably mounted on the second shaft for longitudinal sliding thereon on opposed sides of the annular gear and the collar, the first pair of sawguides adjacent the annular gear, the second pair of sawguides adjacent the collar. The device includes means for urging or biasing the first and second pairs of sawguides slidably towards each other along the second shaft against the annular gear and the collar therebetween respectively whereby the longitudinal translation of the collar along the second shaft relative to the annular gear causes relative longitudinal translation between the first and second pairs of sawguides on the second shaft. A longitudinal array of pairs of sawguides on the second shaft may be simultaneously longitudinally translated in the above manner by means of a longitudinal array of the annular gears and collars mounted on the shaft interspersed between the array of pairs of sawguides.

Advantageously, the first shaft, if parallel to the second shaft, is a pinion shaft or, if perpendicular to the second shaft has a shaft mounted worm gear rigidly mounted thereon for rotatable engagement with the annular gear.

Further advantageously, the first and second pairs of sawguides each include a pair of elongate parallel guide members wherein the first and second pairs of sawguides each comprise a pair of elongate parallel guide members in spaced apart relation for snugly receiving therebetween a sawblade, and wherein the first and second pairs of sawguides have corresponding intermeshing outer surfaces having grooves and ribs in adjacent facing relation adapted to intermesh when the first and second pairs of sawguides are longitudinally translated on the second shaft into close adjacency, assuming the sawblade is slidably mounted on a saw arbor in longitudinally splined sliding relation thereon, and the saw arbor is parallel to said second axis.

BRIEF DESCRIPTION OF THE DRAWINGS

The invention will be better understood by reference to the accompanying drawings, wherein:

FIG. 1 is a cross sectional side elevation view according to a preferred embodiment of the invention;

FIG. 3 is an enlarged, fragmentary, cross-sectional view of the sawguides in the expanded position along line 3—3 in FIG. 2a;

FIG. 4 is the enlarged, fragmentary, cross-sectional view of the sawguides of FIG. 3 translated into close adjacency;

FIG. 5b is a cross-sectional partial cutaway view taken along line 5b—5b in FIG. 5a;

FIG. 9 is, in side elevation fragmentary view, an alternative embodiment of the sawguide positioning device of the present invention;

FIG. 10 is, in fragmentary front elevation view, the alternative embodiment of FIG. 9.

DETAILED DESCRIPTION OF PREFERRED EMBODIMENTS

Figure 2A:
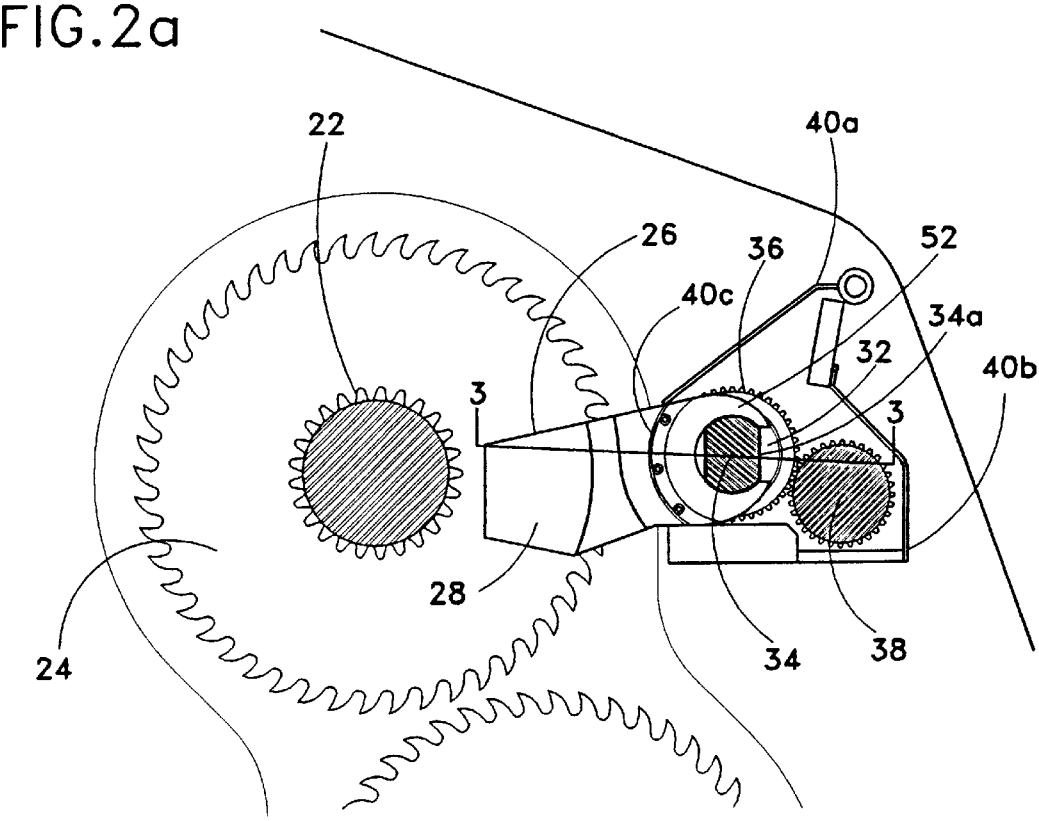
FIG. 2a is an enlarged, fragmentary, side elevation view of the embodiment of FIG. 1.
Figure 2B:
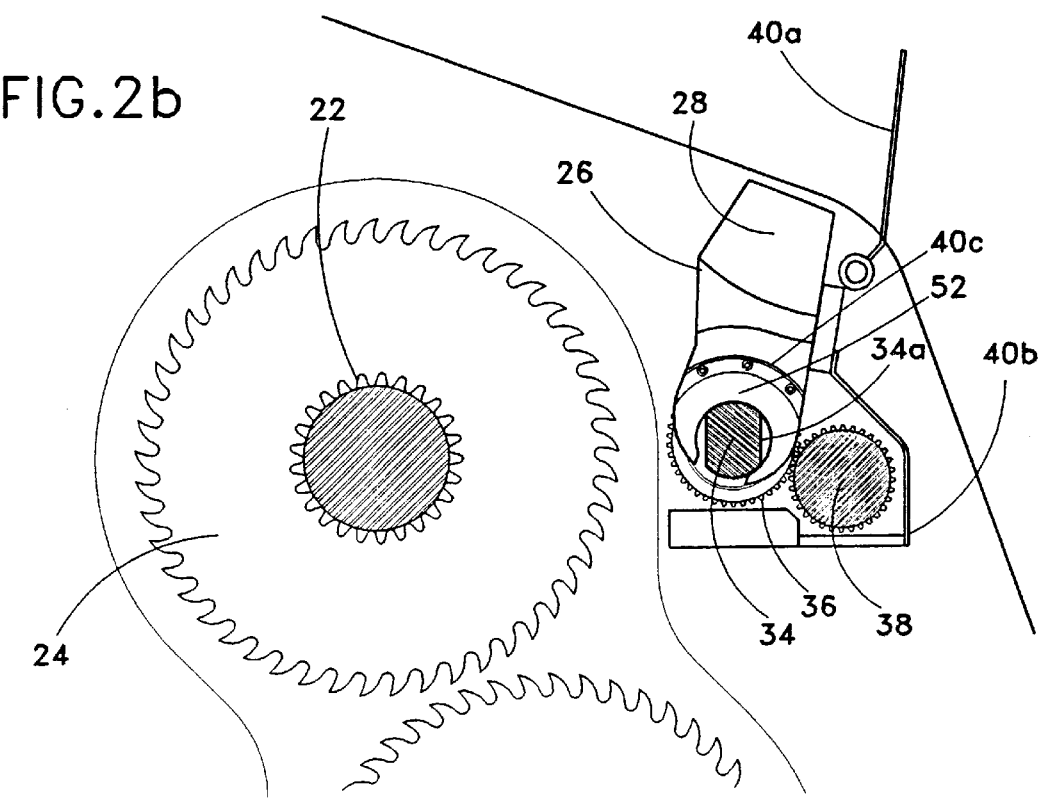
FIG. 2b is an enlarged, fragmentary, side elevation view of the sawguide of FIG. 2a, showing the sawguide in an elevated position.
Figure 3:
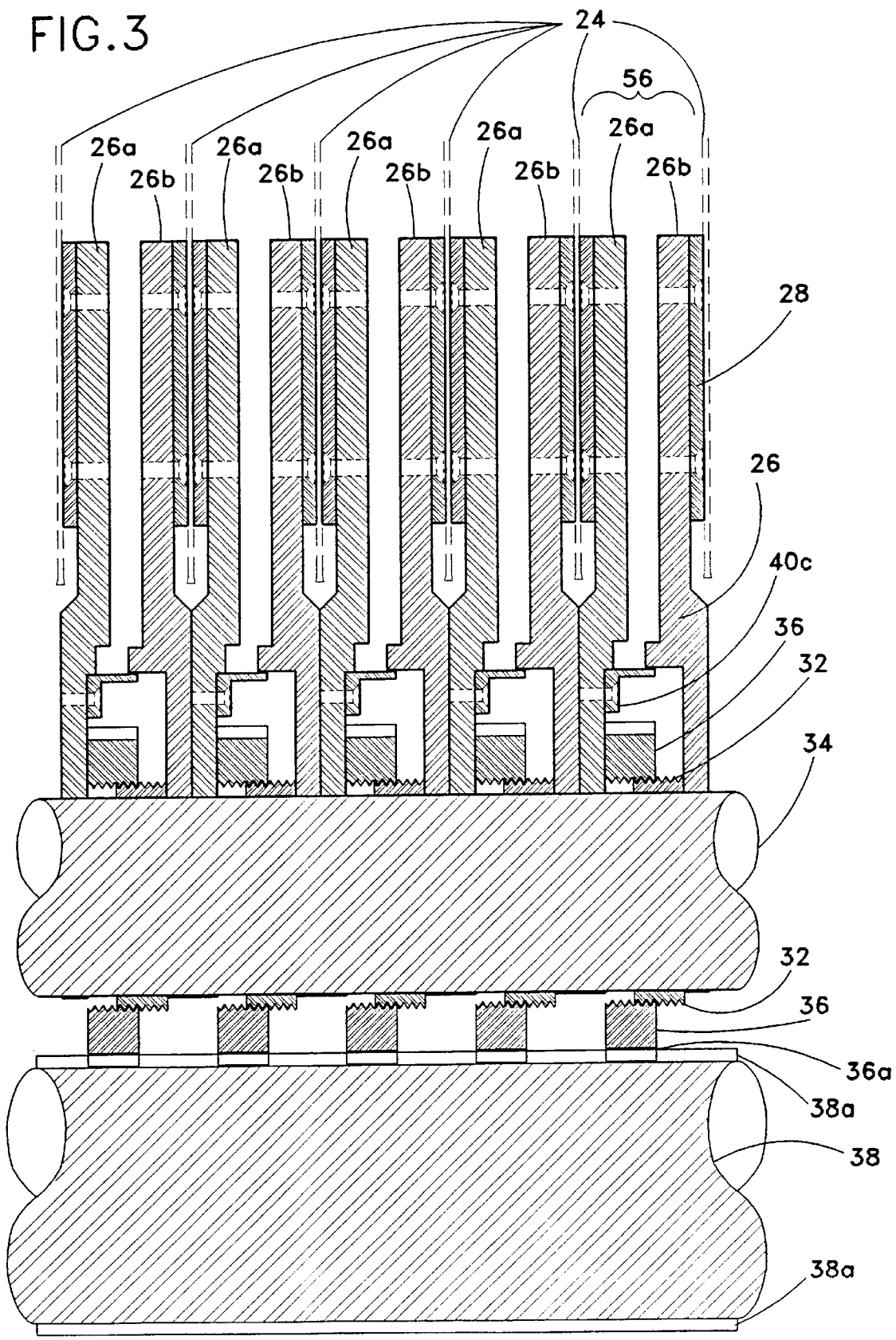

Referring to the drawing figures wherein similar characters of reference represent corresponding parts in each view, the sawguide positioning device of the present invention is generally indicated by the reference numeral 10 in FIG. 1. The device 10 includes a support frame constructed of structural plates 12, a plurality of driven feed rolls 14, press rolls 16 and corresponding actuating cylinders 18. There is at least one splined saw arbor 22 having a plurality of saw blades 24 splined thereon. As better seen in FIGS. 2a, 2b, 3 and 4, each saw blade 24 has a corresponding sawguide set or pair 26. Each sawguide set 26 has two elongate plates or sawguide members 26a and 26b. Sawguide pads 28 are sandwiched between sawguide members 26a and 26b. Sawguide pads 28 contact the saw blades 24, one pad 28 on each opposite side of blades 24 and mounted to the corresponding sawguide member.

Figure 8:
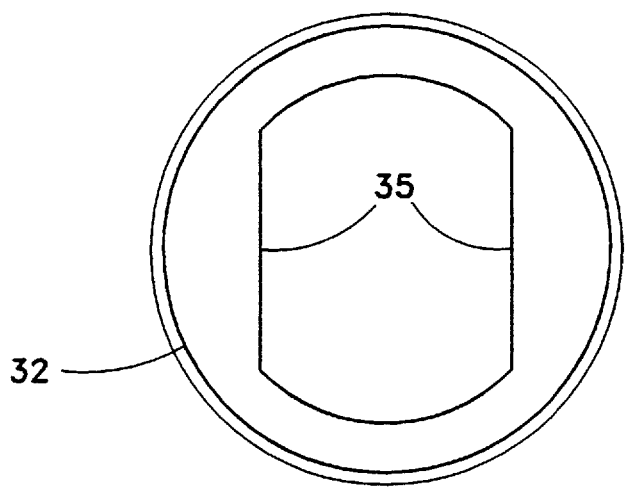
FIG. 8 is the externally threaded collar of the preferred embodiment.

Positioned adjacent and between sawguide sets 26 are externally threaded collars 32 that are slidingly fitted onto sawguide bar 34 so as to slide longitudinally along sawguide bar 34. Threaded collars 32 are prevented from rotating relative to sawguide bar 34 by internal flanges 35, best seen in FIG. 8, on threaded collars 32 which extend inwardly of collars 32 to lie in flush sliding engagement with flat surfaces 34a on sawguide bar 34. Also positioned between adjacent sawguide sets 26 are internally threaded annular gears 36. Threaded annular gears 36 have internal threads engaging the external threads on corresponding externally threaded collars 32. Threaded annular gears 36 include gear teeth 36a, engaging splines or elongate gear teeth 38a on pinion shaft 38.

Figure 6:
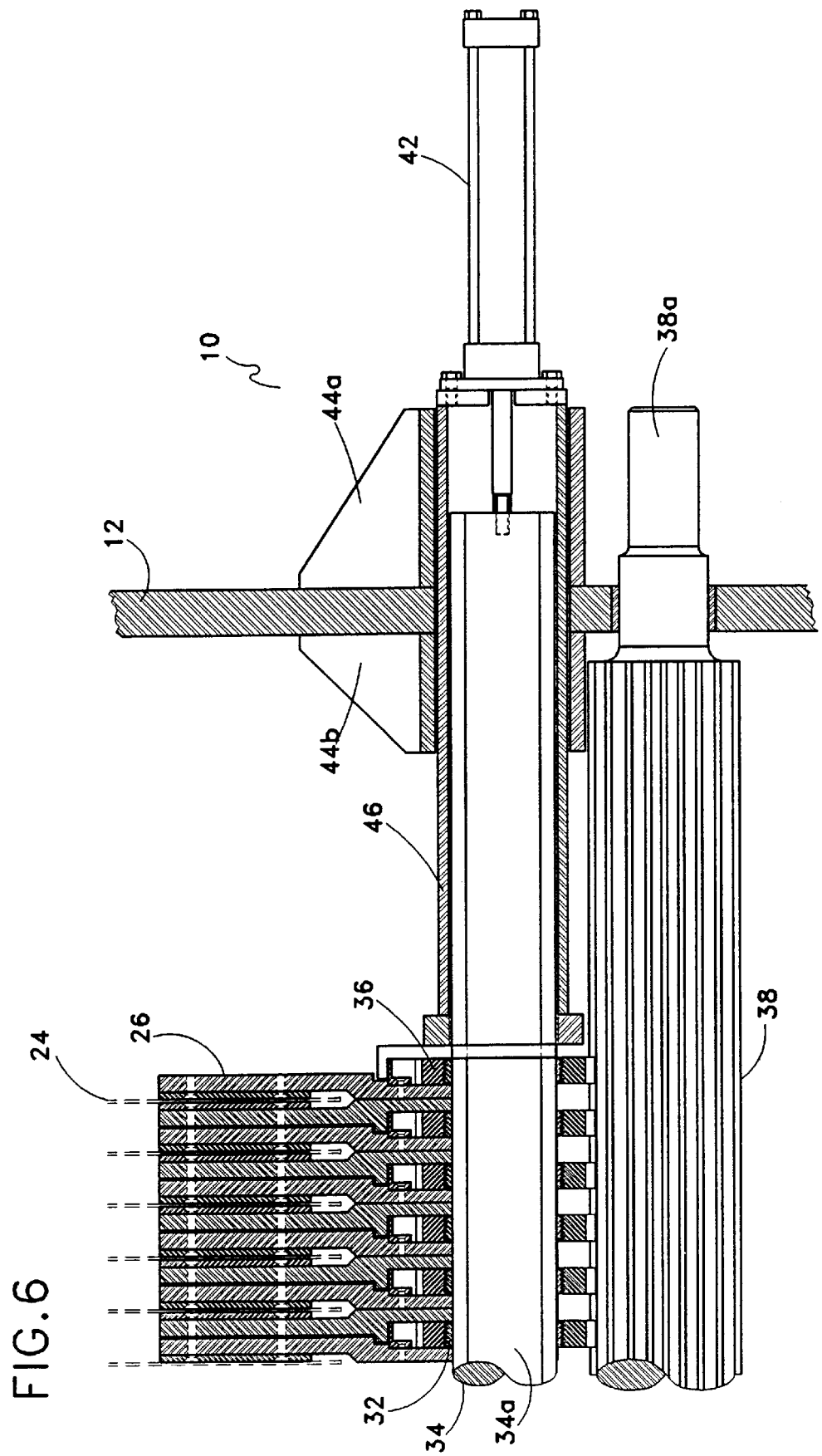
FIG. 6 is an enlarged, fragmentary, side cross-sectional view of a first end mount of the sawguide bar showing the hydraulic press and the sawguide bar connection, and pinion drive end.

Seals 40a, 40b & 40c prevent or inhibit debris from falling onto threaded annular gears 36 and threaded collars 32 when a clamping pressure, applied to clamp adjacent sawguide sets 26 together by means of hydraulic cylinder 42 acting on tubular cylinder 46 as seen in FIG. 6, is withdrawn or reduced to allow for changing of the spacing between sawblades 24. Support webs 44a and 44b mounted on a tubular cylinder 46 support one end of the sawguide bar 34 telescopically therein when adjusting the position of sawguides 26, that is, when changing threaded collar range sizes.

Figure 7:
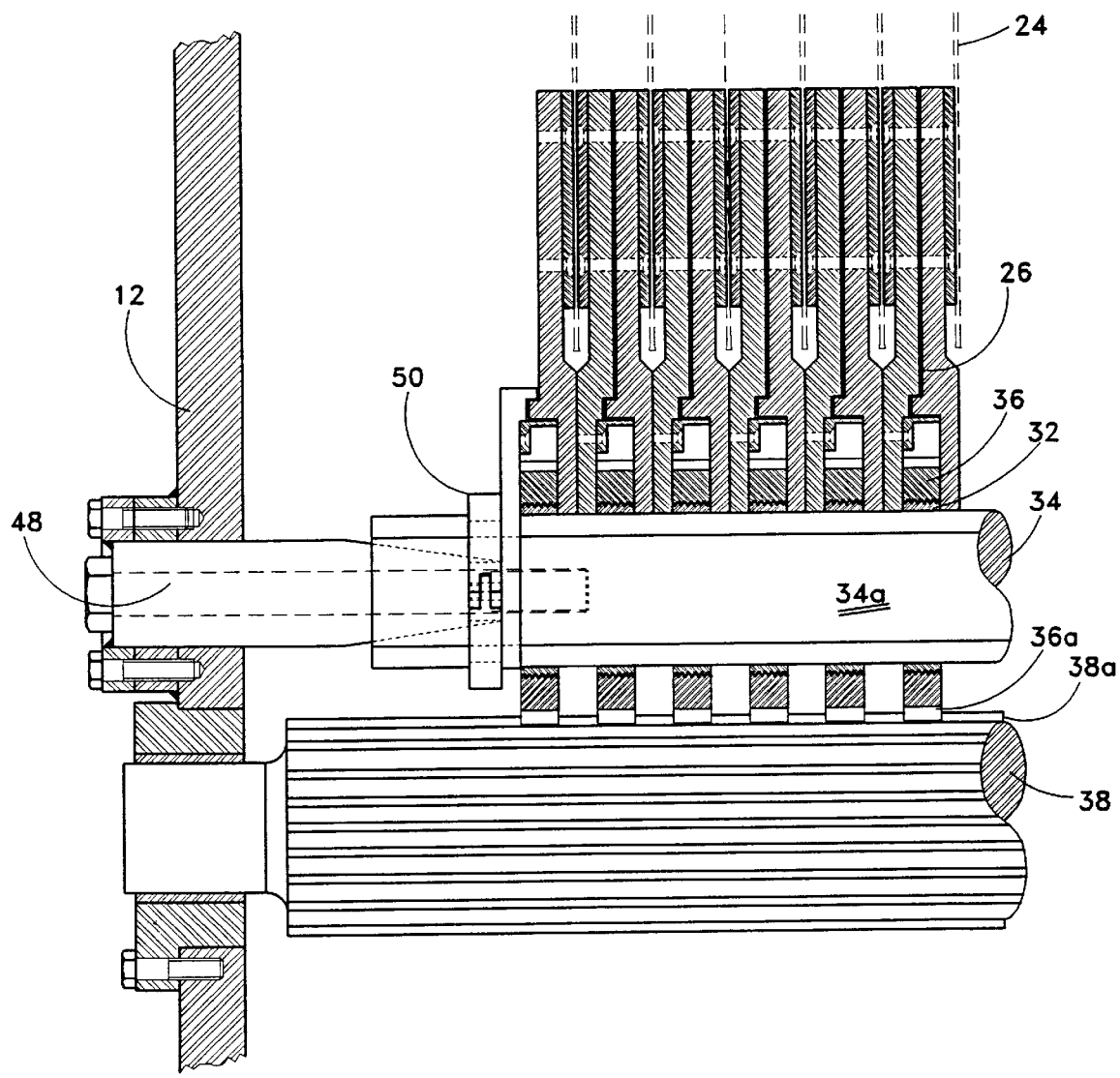
FIG. 7 is an enlarged, fragmentary, side cross-sectional view of a second end mount of the sawguide bar.

As seen in FIG. 7, removable support tip 48, and removable retaining ring 50 are mounted on the end of the sawguide bar 34 opposite to cylinder 46. Support tip 48 and retaining ring 50 are removable to allow threaded collars 32 and threaded annular gears 36 to be removed from sawguide bar 34 once sawguide sets 26 have been rotated up (by hydraulic actuation or manually) from their lowered position seen in FIG. 2a into their raised position illustrated in FIG. 2b, and lifted from the sawguide bar 34 by sliding sawguide collars 52 over flat surfaces 34a on saw guide bar 34.

In operation, pinion shaft 38 may be rotated in predetermined or actively determined angular increments by a stepper motor (not shown) or other means well known in the art. Splines or teeth 38a on pinion shaft 38 are meshed with teeth 36a on threaded annular gear 36. Rotation of pinion shaft 38 causes rotation of the threaded annular gears 36. In turn, the threaded annular gears 36 either thread onto or off threaded collars 32, thereby respectively decreasing or increasing the distance, that is, the spacing between adjacent sawguide pairs 26 having annular gears 36 and collars 32 therebetween. Advantageously, a portion of thread in corresponding threaded engagement between threaded collars 32 and threaded annular gears 36 remains engaged when saw spacing 56 between sawblades 24 is at a maximum to thereby maintain stable positioning of sawguides 26 and facilitate clamping or pressing together of sawguides 26 by hydraulic cylinder 42. Once the desired saw spacing 56 is attained by rotating pinion shaft 38, hydraulic press 42 presses sawguide sets 26 together, thus clamping the sawguides sets 26 and fixing the target lumber size as corresponding to the saw spacing 56.

In a circular saw gang with two or more zones, the pinion shaft 38 is split into sections corresponding to the zones. Thus each section of pinion shaft 38 may be rotated by different angular amounts so as to independently set saw spacing 56, depending on the lumber target size desired in that particular zone of the gang saw.

Figure 5A:
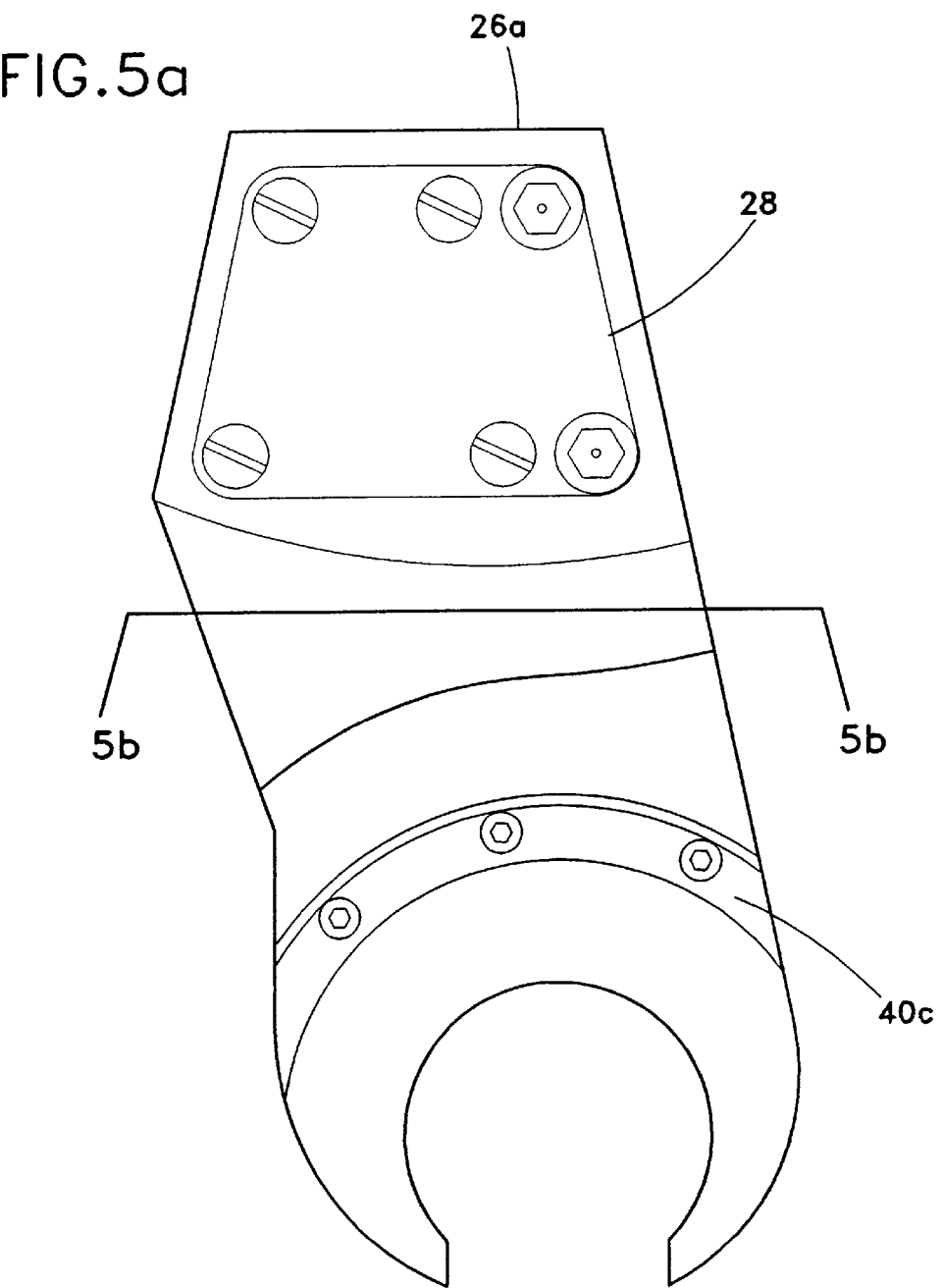
FIG. 5a is an enlarged side elevation view of a sawguide.
Figure 5B:
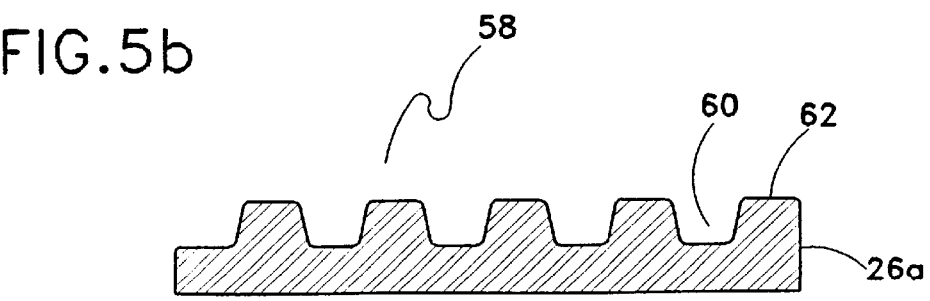

It has been found that plates 26a and 26b of sawguide pairs 26 should be of a sufficient thickness that the plates are not prone to vibration and are sufficiently structurally rigid. The thickness of plates 26a and 26b limits how closely sawblades 24 may be spaced on sawblade arbor 22. To allow for closer spacing, in the preferred embodiment, the outer surfaces 58 of plates 26a and 26b of sawguide pairs 26 may be correspondingly grooved, as with grooves 60 between lands, flanges or ribs 62 as depicted in FIG. 5b.

Thus grooves 60 on plates 26a on a first sawguide pair 26 will intermesh with ribs 62 on plates 26b on a next adjacent sawguide pair 26, and ribs 62 on plates 26a on the first sawguide pair 26 will mate with grooves 60 on plates 26b on the next adjacent sawguide pair 26, when sawguide pairs 26 are positioned closely adjacent to one another as seen in FIGS. 6 and 7, allowing for close spacing of sawblades 24 while maintaining structural rigidity of plates 26a and 26b.

In an alternative embodiment, as depicted in FIGS. 9 and 10, pinion shaft 38 may be replaced with worm gear shafts 64 on which are mounted worm gears 66. Each internally threaded annular gear 36 has, in this embodiment, a corresponding worm gear 66 in threaded engagement with gear teeth 36a on the outer toothed surface of threaded annular gear 36 so that rotation of worm gear shafts 64 rotate worm gears 66 and, consequently, rotate threaded annular gears 36. As described above, rotation of threaded annular gears 36 causes sawguide pairs 26 to move closer together or to move apart depending if threaded annular gear 36 is, respectively, being threadably rotated onto, or being threadably rotated off, externally threaded collar 32. In this embodiment the structure is supported by supporting member 54.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for circular gang saws, positioning sawguides is mountable, the device comprising:

a first rotatable about a first axis, an annular gear journalled on and coaxial with a second shaft lying along a second axis, said annular gear having an outer surface and a concentric threaded inner surface and rotatable in a first plane about said second axis, said first plane generally perpendicular to said second axis, said first shaft rotatable engagable with said outer surface of said annular gear wherein rotation of said first shaft about said first axis rotates said annular gear about said second axis, a collar slidably mounted on said second shaft for longitudinal sliding along, said second shaft, said collar and said second shaft adapted so as to prevent rotation of said collar relative to said second shaft said collar having an outer threaded surface concentric with said threaded inner surface on said annular gear for journalled threaded engagement of said outer threaded surface in said threaded inner surface whereby rotation of said annular gear by said first shaft causes longitudinal translation of said collar along said second shaft relative to said annular gear, first and second pairs of sawguides slidably mounted on said second shaft for longitudinal sliding thereon, one of said pairs of sawguides being mounted on one side of said annular gear and said collar and the other pair of sawguides being mounted on the opposite side of said annular gear and said collar, whereby said longitudinal translation of said collar along said second shaft relative to said annular gear changes a distance between said first and second pairs of sawguides.

2. The device of claim 1 wherein said second axis is parallel to said first axis.

3. The device of claim 2 wherein said first shaft is a pinion shaft rotatably engagable in toothed engagement with said annular gear.

4. The device of claim 3 wherein said first and second pairs of sawguides each comprise a pair of elongate parallel guide members in spaced apart relation for snugly receiving therebetween a sawblade, and wherein said first and second pairs of sawguides have corresponding intermeshing outer surfaces in adjacent facing relation adapted to intermesh when said first and second pairs of sawguides are longitudinally translated on said second shaft into close adjacency.

5. The device of claim 4 wherein said elongate parallel guide members are elongate in a first direction perpendicular to said second axis and said intermeshing outer surfaces have therein elongate grooves in said first direction and alternating thereby between raised elongate flanges, and wherein said elongate grooves and elongate flanges on said outer surface on said first pair of sawguides is offset in relation to corresponding said elongate grooves and said elongate flanges in said adjacent facing relation on said outer surface on said second pair of sawguides, whereby said elongate grooves on said first pair of sawguides intermesh with corresponding said elongate flanges in said adjacent facing relation on said second pair of sawguides and said elongate flanges on said first pair of sawguides intermesh with corresponding said elongate grooves in said adjacent facing relation on said second pair of sawguides to thereby stiffen said elongate parallel guide members while providing an apparent reduced thickness when in said close adjacency.

6. The device of claim 1 wherein said second axis is generally perpendicular to said first axis.

7. The device of claim 6 wherein said first shaft included a worm gear rigidly mounted thereon for rotatable engagement with said annular gear.

8. The device of claim 7 wherein said first and second pairs of sawguides each comprise a pair of elongate parallel guide members in spaced apart relation for snugly receiving therebetween a sawblade, and wherein said first and second pairs of sawguides have corresponding intermeshing outer surfaces in adjacent facing relation adapted to intermesh when said first and second pairs of sawguides are longitudinally translated on said second shaft into close adjacency.

9. The device of claim 8 wherein said elongate parallel guide members are elongate in a first direction perpendicular to said second axis and said intermeshing outer surfaces have therein elongate grooves in said first direction and alternating thereby between raised elongate flanges, and wherein said elongate grooves and elongate flanges on said outer surface on said first pair of sawguides is offset in relation to corresponding said elongate grooves and said elongate flanges in said adjacent facing relation on said outer surface on said second pair of sawguides, whereby said elongate grooves on said first pair of sawguides intermesh with corresponding said elongate flanges in said adjacent facing relation on said second pair of sawguides and said elongate flanges on said first pair of sawguides intermesh with corresponding said elongate grooves in said adjacent facing relation on said second pair of sawguides to thereby stiffen said elongate parallel guide members while providing an apparent reduced thickness when in said close adjacency.

\* \* \* \* \*